Figure 1:
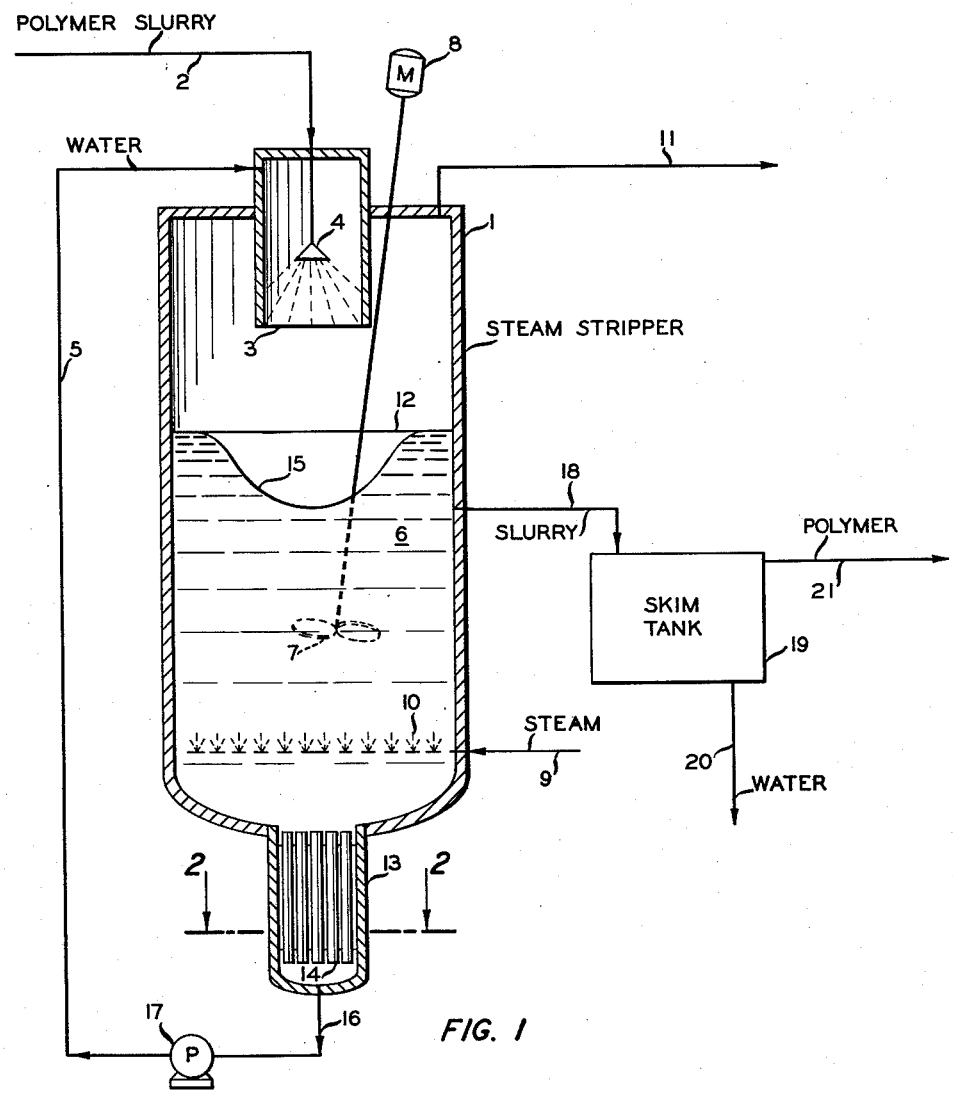

Nov. 7, 1961   W. J. WRIDE ET AL   3,007,578
LIQUID DRAIN LEG FOR REACTOR VESSEL
Filed Aug. 26, 1957

INVENTORS
W. J. WRIDE
J. J. MOON
BY Hudson & Young
ATTORNEYS

United States Patent Office 3,007,578
Patented Nov. 7, 1961

3,007,578
LIQUID DRAIN LEG FOR REACTOR VESSEL
William J. Wride and John J. Moon, Bartlesville, Okla., assignors to Phillips Petroleum Company, a corporation of Delaware
Filed Aug. 26, 1957, Ser. No. 680,181
3 Claims. (Cl. 210—197)

This invention relates to a liquid drain leg for a vessel. In one of its aspects this invention relates to an improved drain leg for a stirred vessel. In a more limited aspect, this invention relates to an improved apparatus for steam stripping a polymer slurry.

In numerous processes, it is desirable to separate a solids free stream from a solids slurry wherein the solids have a density less than that of the liquid medium. Frequently a dip leg or drain leg is employed in the bottom of such a stirred vessel and the light solids tend to rise in such a leg and thus the amount of solids passing out of the vessel with the liquid is minimized. However, in the case of a slurry in a stirred vessel, especially with vigorous agitation, the turbulence extends down into the drain leg and this effect entraps substantial amounts of the solids causing them to pass out with the liquid.

It is an object of this invention to provide an apparatus wherein liquid can be removed from an agitated slurry. It is another object of this invention to provide a means for providing a drain leg which will minimize the turbulence of a stream passing therethrough. Another object of this invention is to provide a drain leg of improved design. Still other objects, advantages and features of this invention will be obvious to those skilled in the art upon consideration of this disclosure and the drawing.

According to this invention a drain leg in a stirred vessel is provided with a plurality of vertical partitions to prevent turbulence from extending downwardly into said drain leg.

As has been indicated, the apparatus of this invention is particularly useful in those processes wherein a substantially solids free liquid is removed from an agitated slurry of a light solid in a liquid. The removed liquid can be sent to further processing or discarded, but is usually recycled to the vessel. For example, in separating solvent from polymer, the polymer solvent slurry is passed to a stirred vessel and is mixed with water and the solvent removed by steam stripping. The water is circulated from the bottom of the vessel and is passed to the top of the reactor and is mixed with the incoming slurry of polymer in solvent as is fully described and claimed in the copending application of Robert M. Bellinger et al., Serial No. 595,456, filed July 2, 1956, now Patent No. 2,969,347, issued January 24, 1961. By the present invention, an improved means is provided for removing the recycle water.

Frequently, the stirred vessel will be provided with a dip leg for removing the liquid. However, turbulence due to agitation will extend a considerable distance down this dip leg and the leg must be of sufficient length to provide for settling of the solids and will be dependent upon the amount of agitation, the liquid velocity and the settling velocity of the solids all as is known to the art. We have found that by placing vertical dividers in the dip leg that turbulence is prevented from extending down into said dip leg and therefore, the total depth of said leg can be materially reduced and better separation of solids and liquids is obtained. Whel a single divider affords some advantages of this invention, we prefer a plurality of such dividers, for example, dividing the dip leg into quadrants, or a plurality of vertical parallel dividers or more preferably a plurality of tubes. These resulting tubes can have any cross-sectional configuration desired such as round, elliptical, square, hexagonal, rectangular, etc.

We have now found that for effective removal of solids that the flow through the individual draw-off conduits, which will be referred to hereinafter as the effective dip leg, should be streamline. Now for flow of fluids through an orifice, it requires at least 7 pipe diameters for the fluid stream to free itself of turbulence created by the orifice. Since the cross-sectional configuration of the effective dip legs can be of any desired shape, a length to cross-sectional area ratio is a better criterion. We have found that the length squared of the effective dip legs should be 50 to 75A wherein A is the cross-sectional area of each dip leg expressed in the same units as is the length squared, i.e., $L^2=50$ to $75A$. In order to minimize the length of the dip leg, it is further preferred that each effective dip leg have a cross-sectional area not exceeding 75 square inches. Therefore, by placing a single divider into a dip leg, the length of that dip leg can be reduced materially with the same removal of solids, for example, in removing water from an aqueous slurry of polyethylene through a 16 inch diameter leg at 30 gallons per minute, it will take a dip leg at least 100 inches long and preferably 125 inches to satisfactorily remove the solids while dividing this 16 inch tube into four quadrants, a leg 50 inches in length is required and 60 inches is preferred. With a given leg length of 36 inches, dividing the leg into 12 equal divisions will give optimum results in the above cited example ($36^2=75A$; $A=17.3$ in.$^2$;

$$\frac{(16 \text{ in.})^2 \pi}{4(17.3 \text{ in.}^2)/\text{division}} = 11.6 \text{ divisions})$$

This invention is particularly useful in separating polymer from aqueous slurry. In certain methods for preparing solid polymers, the product is obtained as a solution of polymer in a solvent or diluent material. Inasmuch as the major uses of the polymer require a solid product, it is desirable that the polymer be separated from the solvent material such as by precipitation methods. Several methods have been developed for treating the polymer solution to accomplish this purpose. In each of these methods, the initial step comprises treating the product effluent from polymerization reaction zone so as to precipitate the polymer from solution. In one method, which is described in detail in a copending application of R. A. Findlay, Serial No. 591,864, filed June 18, 1956, now abandoned, precipitation of the polymer is effected by controlled cooling of the polymer solution. The process is carried out in a batch cyclic operation in which the first step consists of filling the cooling zone with the polymer solution. The cooling zone is then closed off and the pressure therein is slowly reduced, at a sufficient rate to provide a relatively constant temperature drop in the solution. More usually the temperature is decreased at a rate between about 1° F. and about 20° F. per minute. After the desired proportion of polymer has precipitated, which may be as high as 90 to 98 percent of the total polymer, the cooling vessel is opened and a slurry of polymer and solvent is discharged therefrom. The polymer can be separated from this slurry by passing to a zone wherein the slurry is vigorously mixed with water and the solvent removed by steam stripping. In a preferred embodiment of the aforedescribed cycle a plurality of cooling vessels is provided so that the effluent passes continuously to one of said zones. It is also possible to pass the solution and/or slurry through a series of vessels with a portion of cooling taking place in each vessel. It is also possible to provide a portion or all of the cooling by indirect heat exchange means.

In another precipitation method, a solution of polymer under high pressure is introduced to a zone of low pressure wherein a portion of the solvent vaporizes. The cooling effect thus provided results in precipitation of the polymer, which material is withdrawn from the low pressure zone as a slurry of polymer in the solvent material. This operation is carried out more usually at a temperature of between about 70° F. and about 180° F., or higher, depending upon the solvent employed. The pressure in the low pressure zone is usually subatmospheric, e.g., between 0.1 and 10 p.s.i.a. The amount of solvent vaporized during flash vaporization and precipitation of the polymer varies over a wide range, usually between about 25 percent and about 75 percent of the amount initially present. This process for effecting precipitation of the polymer is described in detail in the copending application of R. M. Bellinger, Serial No. 506,864, filed May 9, 1955. Here again, the polymer can be recovered from the solvent by slurrying in hot water in conjunction with steam stripping.

In still another method, a slurry of precipitated polymer in solvent is provided by spraying a solution of polymer into liquid water whereby the polymer is dispersed in the water and removed from solution. This operation is carried out by slurrying the solution into water at a temperature sufficiently low to cause the polymer to precipitate. Usually the water will have a temperature in the range 60° F. to 110° F. and the solution will have a temperature in the range 200° F. to 350° F. to give a slurry having a temperature in the range 110 to 150° F. Usually the amount of water used is between about 1 and about 5 pounds per pound of polymer solution. This process is described in detail in a copending application of R. G. Wallace, Serial No. 584,812, filed May 14, 1956, now abandoned.

In all of the above processes, the solvent can be removed from the water slurry by steam distillation.

A preferred method of carrying out the steam distillation is to spray a slurry of polymer in the hydrocarbon diluent into a preconcentration zone which is disposed within the vapor space of a steam stripping zone. The preconcentration zone contains a continuous concave surface, for example, the inner surface of an elongated cylinder, which is disposed vertically in said vapor space. The concave surface is continuously supplied with heated water to provide a moving film of liquid thereon. The feed material is sprayed on the wetted surface from a central position of the preconcentration zone, passing through a vapor space before contacting said surface. During this operation, steam introduced to the stripping zone passes upwardly into the vapor space in contact with the sprayed material and the wetted surface. Due to the partial pressure effect of the steam and the temperature of the heated water film, solvent is vaporized from the sprayed material. When the sprayed material contacts the wetted wall of the preconcentration zone, the velocity of contact of the wetting liquid and slurry causes the polymer to be dispersed therein, thereby preventing agglomeration of polymer particles. The presence of the liquid film and the velocity thereof also prevents the polymer from sticking to the walls of the predrying zone. As the polymer-solvent-water mixture passes downwardly along the wetting surface, it is continuously exposed to steam, thus effecting a continuous evaporation of solvent.

Leaving the preconcentration zone, the polymer-water-solvent mixture drops through the stripping zone vapor space into a liquid mixture of water, solvent and polymer. This mixture is usually under vigorous agitation and steam is introduced below the level of the liquid mixture in sufficient quantities to provide a temperature and stripping effect which is adequate to remove the remaining solvent from the mixture. A product, comprising polymer and water, essentially free from solvent is withdrawn from the stripping zone, usually from the bottom portion thereof. This material is passed through additional processing operations, for example, skimming and drying, whereby a dried solvent-free polymer product is provided.

In view of the agglomeration tendencies of the polymer, it is desirable that the slurry entering the preconcentration zone be maintained below about 8 percent polymer by weight. More usually, the concentration of polymer in the feed material is between about 2 and about 6 percent. This process is more fully described in the aforesaid copending application of Robert M. Bellinger et al.

This invention has particular advantage in the foregoing method of Bellinger et al. in that it permits the withdrawal of substantially polymer-free liquid from the stripping zone to be used for wetting the surface of the preconcentration zone.

This invention is applicable in general to removing substantially solid free liquid from an agitated slurry of a light solid in a liquid. It has particular utility when applied to the treatment of a slurry of polymers such as, for example, olefin polymers in a water slurry. Olefin polymers usually treated are polymers of 1-olefins having a maximum of 8 carbon atoms per molecule and no branching nearer the double bond than the 4-position such as ethylene, propylene, butene-1, pentene-1, hexene-1, octene-1, 4-methyl-1-pentene, 4-methyl-1-hexene, 5-methyl-1-heptene, 6-methyl-1-heptene, 4-ethyl-1-hexene and the like. These monomers can be polymerized alone or with each other or with other aliphatic olefins such as butene-2 and butadiene.

This invention is particularly applicable to polymer slurries prepared from ethylene which said polymers have a density of at least 0.94 and preferably 0.96 or higher and a crystallinity of at least 70 percent and preferably at least 80 percent, at ambient temperatures. While these polymers represent a preferred embodiment, it is not intended that the invention be limited to these polymers or even to polymers of any type.

A number of methods are available for preparing polymers of olefins. One method is described in detail in the copending application of Hogan and Banks, Serial No. 573,877, filed March 26, 1956, now U.S. Patent 2,825,721, issued March 3, 1958. This particular method utilizes a chromium oxide catalyst, preferably containing hexavalent chromium, with silica, alumina, silica-alumina, zirconia, thoria, etc. In one embodiment of this application, olefins are polymerized in the presence of a hydrocarbon diluent, for example, an acrylic, alicyclic or aromatic compound which is inert and in which the polymer formed is soluble. The reaction is carried out at a temperature between about 150° F. and about 450° F. and usually under a pressure sufficient to maintain the diluent in the liquid state. The polymers produced by this method, particularly the polymer of ethylene, are characterized by having an unsaturation which is principally either transinternal or terminal vinyl, depending on the particular process condition employed. When low reaction temperatures, about 150° F. to about 320° F., and a mobile catalyst are employed for polymerization, the product polymer is predominantly terminal vinyl in structure. When polymerization is carried out at higher temperatures and in a fixed catalyst bed, the polymer has predominantly transinternal unsaturation, polymers prepared by both methods are also characterized by their high densities and high percentage of crystallinity. In the copending application of Leatherman and Detter, Serial No. 590,567, filed June 11, 1956, a method is described wherein the polymer is prepared in a hydrocarbon slurry in the presence of the Hogan and Banks catalyst wherein the temperature is maintained below the temperature wherein the polymer being formed is soluble, therefore, the polymer is formed as discrete particles. In such operation, the hydrocarbon diluent is preferably a paraffin hydrocarbon of 3 to 12 carbon atoms per molecule with pentane being frequently preferred.

Other procedures which employ different catalysts are also used for preparing olefin polymers. For example, polymers are prepared in the presence of organometallic compounds such as triethylene aluminum plus titanium tetrachloride, mixtures of ethylaluminum halides with titanium tetrachloride, and the like. Another group of catalysts which is used comprises a halide of a group IV metal such as, for example, titanium tetrachloride, silicon tetrabromide, zirconium tetrachloride, tin tetrabromide, etc., with one or more free metal selected from the group consisting of sodium, potassium, lithium, rubidium, zinc, cadmium, and aluminum.

The solvent or diluent employed in the polymerization reaction includes, in general, hydrocarbons which dissolve the polymers at the temperature employed in the reaction zone. Among the more useful solvents are paraffins having between 3 and 12 carbon atoms per molecule, such as, for example, propane, isobutane, n-pentane, isopentane, isooctane, etc., and preferably those paraffins having 5 to 12 carbon atoms per molecule. Also useful in the polymerization reaction are alicyclic hydrocarbons, such as cyclohexane, methyl cyclohexane, etc. Aromatic diluents are also used, however, in some instances they (or impurities therein) tend to shorten the catalyst life, therefore, their use will depend on the importance of catalyst life. All of the foregoing and in addition, other hydrocarbon diluents which are relatively inert and in the liquid state at the reaction conditions may also be employed in carrying out the reaction of olefins to form solid polymers.

This invention will be further described with reference to the drawings of which:

FIGURE 1 is a schematic diagram of a steam stripper employing the dip leg of this invention.

Figure 2:
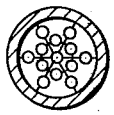
Figure 3:
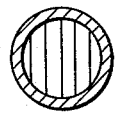
Figure 4:
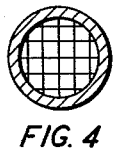

FIGURES 2, 3, and 4 are plan views of different embodiments of the arrangement of the separators in a dip leg of this invention.

Referring now to the drawing, polymer slurry is passed to vessel 1 via conduit 2 and is sprayed into preconcentration zone 3 via nozzle 4. The nozzle 4 is so arranged that a large portion of the spray hits the walls of zone 3. At the same time, hot water from conduit 5 enters zone 3 tangentially so as to cover the inner wall of zone 3. The solvent is partially evaporated in this zone and the remaining water-polymer-solvent slurry gravitates to the liquid 6 in stripper 1 which is kept under agitation by the stirrer 7 driven by motor 8. Steam from conduit 9 enters zone 1 via nozzles 10. The steam vaporizes the solvent and carries it overhead, along with solvent vapors formed in zone 3 and the gas phase in zone 1, and out of the system to solvent recovery, not shown, via conduit 11. The liquid level in zone 1 is shown by line 12. Extending downward from stripper 1 is a dip leg 13. This dip leg contains a plurality of tubes 14 extending downwardly therein. These tubes break the turbulence created by agitation and prevent it extending into the dip leg. The agitation is such to provide a small vortex 15 but must provide turbulence throughout the vessel in order to maintain a uniform slurry. Slurry is drawn into this dip leg and due to the difference in density of the polymer and water, the polymer rises and is taken up into the swirling mass of slurry in zone 1. This leaves substantially polymer-free water passing via conduit 16, pump 17 and conduit 5 to preconcentration zone 3. The polymer slurry in water is removed from stripper 1 via conduit 18 to skim tank 19 which can have a screen if desired. Water is removed from the bottom of skim tank 19 via conduit 20 and can be discarded or recycled as desired. The polymer is removed via conduit 21 and is dried and passed to further processing as desired.

In the above description, the leg is shown as being in the center of the stripping vessel, however, this dip leg can be located any place desired in the bottom of the vessel.

*Specific embodiment*

A 3.8 percent solution of polyethylene in cyclohexane was prepared by polymerizing ethylene at 285° F. in solution in cyclohexane and in the presence of 0.2 weight percent catalyst consisting of 2.3 percent chromium as the oxide on a 90/10 silica/alumina support according to the Hogan and Banks method. This solution at 248° F. was mixed with 3 volumes of water per volume of solution to give a resulting polymer slurry in water-solvent at a temperature of 125° F. This slurry was introduced into a steam stripper as described in the drawing with the exception that no dividers were provided in the dip leg. The steam stripper was 5.5 feet in diameter and about 5.5 feet in height and the water slurry liquid level was about ½ the depth of the stripping vessel. The dip leg consisted of a 16 inch O.D. pipe 36 inches in length. The stripping vessel was provided with a stirrer and the contents were continuously under vigorous agitation. The stripping zone operated at atmospheric pressure and 170° F. with steam being continuously admitted below the liquid level. Water at the rate of 30 gallons per minute (approximately 0.056 ft. per second) was withdrawn through the dip leg and recirculated to the top of the stripping vessel as shown. The amount of polymer in the circulating water was considerable.

A second run was made wherein the dip leg was provided with a pair of vertical dividers intersecting about at the midpoints and the intersection coinciding approximately with the vertical axis of the dip leg so as to divide the dip leg into quadrants. These dividers were approximately 30 inches in length. The remaining conditions were substantially the same as the first run. The recirculating water was substantially free of polymer.

We claim:

1. An apparatus for the separation of a slurry of finely divided polyolefin particles dispersed in a liquid hydrocarbon and water admixture which comprises, in combination, a vertically disposed enclosed vessel, an elongated cylinder open at one end disposed in the top of said vessel, said cylinder being in open communication with said vessel at its open end, means for feeding said slurry into said cylinder, means in an upper portion of said vessel for withdrawing vaporized hydrocarbon, means at an intermediate portion of said vessel for withdrawing said particles and water, means in the lower portion of said vessel for introducing a stripping medium, means for agitating said slurry in said vessel, a drain leg projecting downwardly from said vessel, and a plurality of vertical dividers in said drain leg disposed so as to divide said drain leg into a plurality of vertical open ended conduits, each said conduit having a minimum length determined by the formula: $L=\sqrt{NA}$, where L is the length of said conduit and A is the cross-sectional area of said conduit expressed in the square of the unit of length, and N is a numerical value within the range of about 50 to about 75, and conduit means for passing liquid from a lower portion of said drain leg to said cylinder and means for pumping liquid in said conduit.

2. The apparatus of claim 1 wherein the length of said conduit is determined by the formula $L=\sqrt{50A}$ where L is the length of said conduit and A is the cross sectional area of said conduit expressed in length units squared.

3. An apparatus for the separation of a slurry of finely-divided polyolefin particles dispersed in a liquid hydrocarbon and water mixture comprising, in combination, a vessel, means for introducing said slurry into said vessel, means in an upper portion of said vessel for withdrawing vaporized hydrocarbon, means for agitating said slurry in said vessel, means at an intermediate portion of said vessel for withdrawing said particles and water, means in the lower portion of said vessel for introducing a stripping medium, a drain leg projecting downwardly from said vessel, a plurality of vertical dividers in said drain leg extending downwardly through said drain leg so as to divide said drain leg into a plurality of open end conduits opening to a common outlet at the lower extremity of said drain leg, each of said conduits having a minimum length equivalent to the square root of the quantity N times the cross sectional area of each of said conduits where N is a numerical value within the range of about 50 to about 75, a conduit means for passing liquid from a lower level of said drain leg to an upper level of said vessel, and means for pumping liquid through said conduit.

References Cited in the file of this patent

UNITED STATES PATENTS

| | | |
|---|---|---|
| 94,884 | Grogan | Sept. 14, 1869 |
| 660,499 | Fleming | Oct. 23, 1900 |
| 1,311,831 | Morse | July 29, 1919 |
| 2,054,791 | Del Mar | Sept. 22, 1936 |
| 2,168,271 | Perquin et al. | Aug. 1, 1939 |
| 2,191,403 | Tarbox | Feb. 20, 1940 |
| 2,326,326 | Breedis | Aug. 10, 1943 |
| 2,442,809 | Hallier et al. | June 8, 1948 |
| 2,554,492 | Hartman et al. | May 29, 1951 |
| 2,567,450 | Smith et al. | Sept. 11, 1951 |
| 2,647,634 | Barton | Aug. 4, 1953 |
| 2,764,620 | Findlay | Sept. 25, 1956 |
| 2,793,199 | Kurtz | May 21, 1957 |